E. SCHNEIDER.
APPARATUS FOR EXHIBITING MOVING PICTURES.
APPLICATION FILED NOV. 30, 1907.
1,006,292.
Patented Oct. 17, 1911.
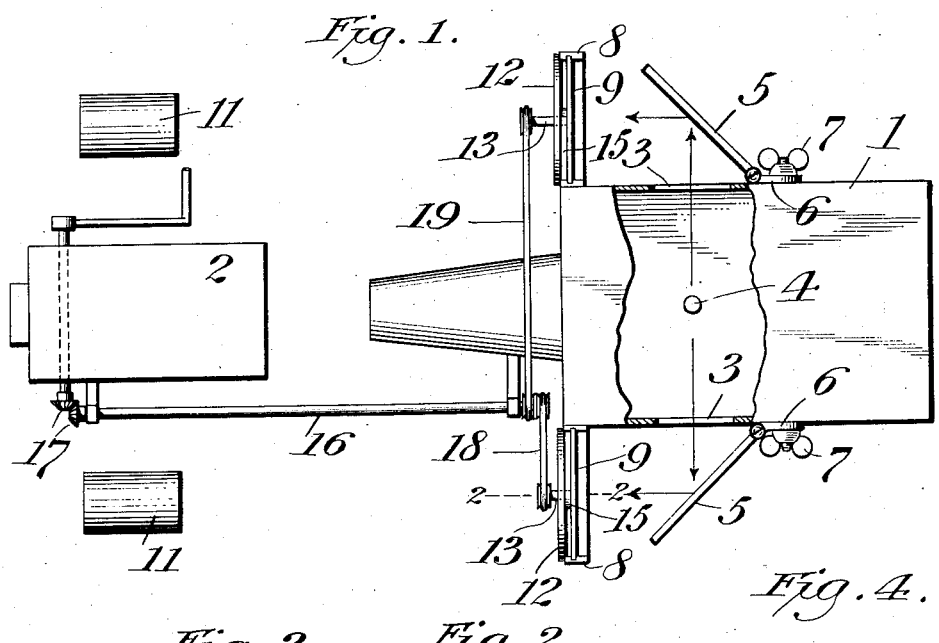
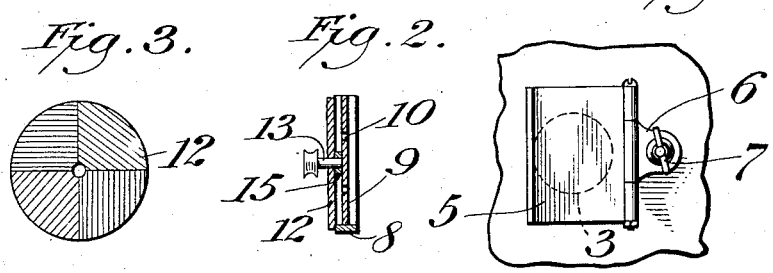
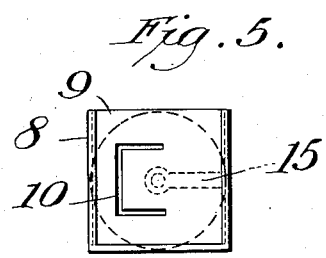
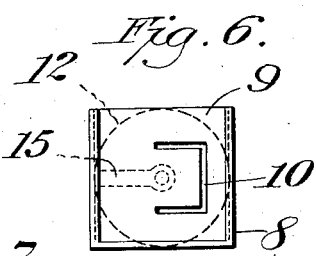
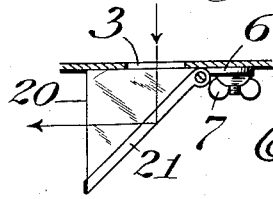
Witnesses:
A. R. Appleman
Fred H. Parks
Inventor:
Eberhard Schneider
By Baxter Morton, Attys

UNITED STATES PATENT OFFICE.

EBERHARD SCHNEIDER, OF NEW YORK, N. Y.

APPARATUS FOR EXHIBITING MOVING PICTURES.

1,006,292.  Specification of Letters Patent.  Patented Oct. 17, 1911.

Application filed November 30, 1907. Serial No. 404,492.

*To all whom it may concern:*

Be it known that I, EBERHARD SCHNEIDER, a citizen of the United States, residing in the borough of Manhattan, city, county, and State of New York, have invented a new and useful Improvement in Apparatus for Exhibiting Moving Pictures, of which the following is a specification.

This invention relates to apparatus for exhibiting moving pictures and it has for its object the provision in such apparatus of means for projecting around the picture on the screen a frame of light.

The invention also contemplates the provision of means for changing the color of the light forming the frame projected around the moving picture so as to produce striking color effects.

The invention further contemplates the provision of means for utilizing the same source of light as that employed in projecting the moving picture to project the frame of light around it.

In the accompanying drawings I have illustrated two slightly different forms of apparatus embodying my invention, those parts of the apparatus which are not characteristic of the present invention being illustrated diagrammatically.

It will, of course, be understood that no attempt has been made to illustrate all the variations which may be made in the apparatus without departing from the spirit of the invention.

In the drawings in which corresponding parts are designated by similar characters of reference in the several views: Figure 1. is a top plan view of moving picture projecting apparatus provided with the improvements forming the present invention, the upper portion of the lamp house being removed in part to disclose the position of the lamp inside and show the paths pursued by the light beam used in projecting the frame of light. Fig. 2. is a vertical section on the line 2—2 of Fig. 1. Fig. 3. is a view of the color disk. Fig. 4. is a view of side elevation showing the mode of mounting each reflector on the lamp house. Fig. 5. and Fig. 6. are views from the rear of the two slide holders containing the slides employed in projecting the frame of light. Fig. 7. is a view showing a reflecting prism mounted on the lamp house in lieu of the mirror shown in Figs. 1 and 4.

Referring now to the drawings and particularly to Fig. 1, 1 designates the lamp house and 2 the apparatus for feeding and exposing the moving picture film in the path of light thrown from the lamp house. As both of these structures are of any ordinary or preferred design, both are illustrated diagrammatically merely. In the walls of the lamp house diametrically opposite each other and with the lamp, ordinarily of the electric arc type, exactly between them, are two openings 3 in the side walls of the lamp house. The electric lamp is diagrammatically indicated at 4 by a small circle representing the outline of one of the carbons. On the outer surface of each side wall of the lamp house is mounted a reflecting device. Mirrors 5 as illustrated in Fig. 1. are preferable in some respects, namely, in lightness, cheapness, and in being foldable against the side walls of the lamp house when not in use. In action, the mirrors are, of course, substantially similar to reflecting prisms, as illustrated in Fig. 7. Each mirror 5 is hinged to a lug or flap 6, which is clamped by means of a horizontal clamping bolt 7 to one of the side walls of the lamp house. The lug or flap 6 is adjustable to the axis of the clamp bolt 7 and the mirror 5 is susceptible of pivotal movement about the axis of the hinge by which it is attached to the lug or plate 6. As will be seen, the formation of the openings in the side walls of the lamp house and the provision of the reflecting mirrors or prisms at the sides of the lamp house results in the projection of two beams of light, one on either side of the lamp house and the film actuating mechanism. In the path of each beam of light thrown by the reflectors 5 is provided a slide holder 8 in which I mount masks 9 formed of cardboard or other suitable sheet material and each provided with an opening or openings for the passage of light so arranged as to form a partial outline or frame around the picture projected on the screen from the mechanism 2. These openings 10 formed in the slides or masks 9 are, in the present instance, illustrated as each composed of three straight portions, a side portion, a top portion and a bottom portion, the side portions of the opening in one slide extending toward the right and those of the other slide extending toward the left. In front of the slide holders 8 and at suitable distance there-from there are provided two projecting lenses, 11, which are mounted in any suitable way, and are arranged to project the light passing through the openings formed in the masks or plates 9 upon the screen in such manner that the top and bottom portions of the two openings will coincide at the ends, thus forming a rectangular frame around the moving picture.

The means provided for changing the color of the light projected to form the frame will be readily understood from an examination of Figs. 1 and 3. In front of each slide holder is mounted a revolving disk 12 which is of transparent colored material preferably glass or celluloid, the divisions of the disk being made as numerous as may be deemed desirable. Each disk is carried on a spindle 13 which turns in bearings afforded by a bracket arm 15 extending from one side of each slide holder. To effect the change of colors in the frame of light projected around the moving picture, the color disks 12 are rotated in front of the slides, the power necessary to effect this rotation being obtained from any suitable source. As illustrated in Fig. 1 the power is obtained from the film mechanism itself by means of the shaft 16, the miter driving pinions 17 and the belts 18 and 19 which run over pulleys near the rear end of the shaft 16 and over pulleys carried by the spindles 13 of the disks 12. It will thus be seen that the power for operating the disks is delivered from the film feeding mechanism directly and does not require any special generator.

It will be understood that the form of the openings 10 which determines the outline of the frame of light projected around the moving picture may be varied indefinitely without departing from the invention. It would even be feasible to dispense with the reflecting device at one side of the mirrors and by changing the form of the opening in the slide or mask 9 to present with a single reflecting device a complete frame of light around the moving picture. Two reflecting devices, however, are manifestly preferable, because a brighter frame of light may thus be obtained and equal brilliancy imparted to both sides of the frame.

The color changing device illustrated is merely typical and not presented as the only practical means for accomplishing this purpose. Numerous modifications of the color changing apparatus will present themselves to persons skilled in the art.

In lieu of the mirrors 5 above described and illustrated in Figs. 1 and 4, reflecting prisms 20 may be substituted, as shown in Fig. 7. Each prism is mounted in the frame 21 hinged to the supporting lug 6 in lieu of the mirror 5. One advantage possessed by reflecting prisms of this character over the mirrors is that they are not subject to deterioration, as the backing of a mirror is, but they are heavier and more expensive than the mirrors.

The disk 12 can be colored in any manner desired, the division into quadrants of different colors being merely illustrative. If desired, portions of the disk may be opaque and other portions may be transparent, and the colors may be selected in any proportions and in any variety desired.

Having thus described my invention, what I claim as new and desire to secure by Letters Patent is:

1. An attachment for moving picture projecting apparatus comprising a reflector adapted to be mounted adjacent to the light of the moving picture projecting apparatus and adapted to utilize light from the same source as that employed in projecting the moving picture, a mask or slide presenting an opening adapted for projecting a frame of light around the moving picture, and means adjacent to said slide for changing the character of light passing through the opening therein.

2. An attachment for moving picture apparatus comprising a reflector, a support for a mask or slide, a mask or slide for an opening for the projection of light to form a frame around the moving picture, a screen mounted adjacent to said mask or slide and movable in relation thereto, whereby the character of the light passing through the opening in the mask or slide is varied, and a lens for projecting the light passing through the opening in the mask or slide, whereby a frame of light is formed around the moving picture.

In testimony whereof, I have signed my name in the presence of two witnesses.

EBERHARD SCHNEIDER.

Witnesses:
 BAXTER MORTON,
 OTTO MUNK.